Sept. 20, 1949. E. V. FINDLEY 2,482,406
CABLE ACTUATED HOISTING MECHANISM
Filed July 26, 1948 4 Sheets-Sheet 1

INVENTOR
Earl V Findley

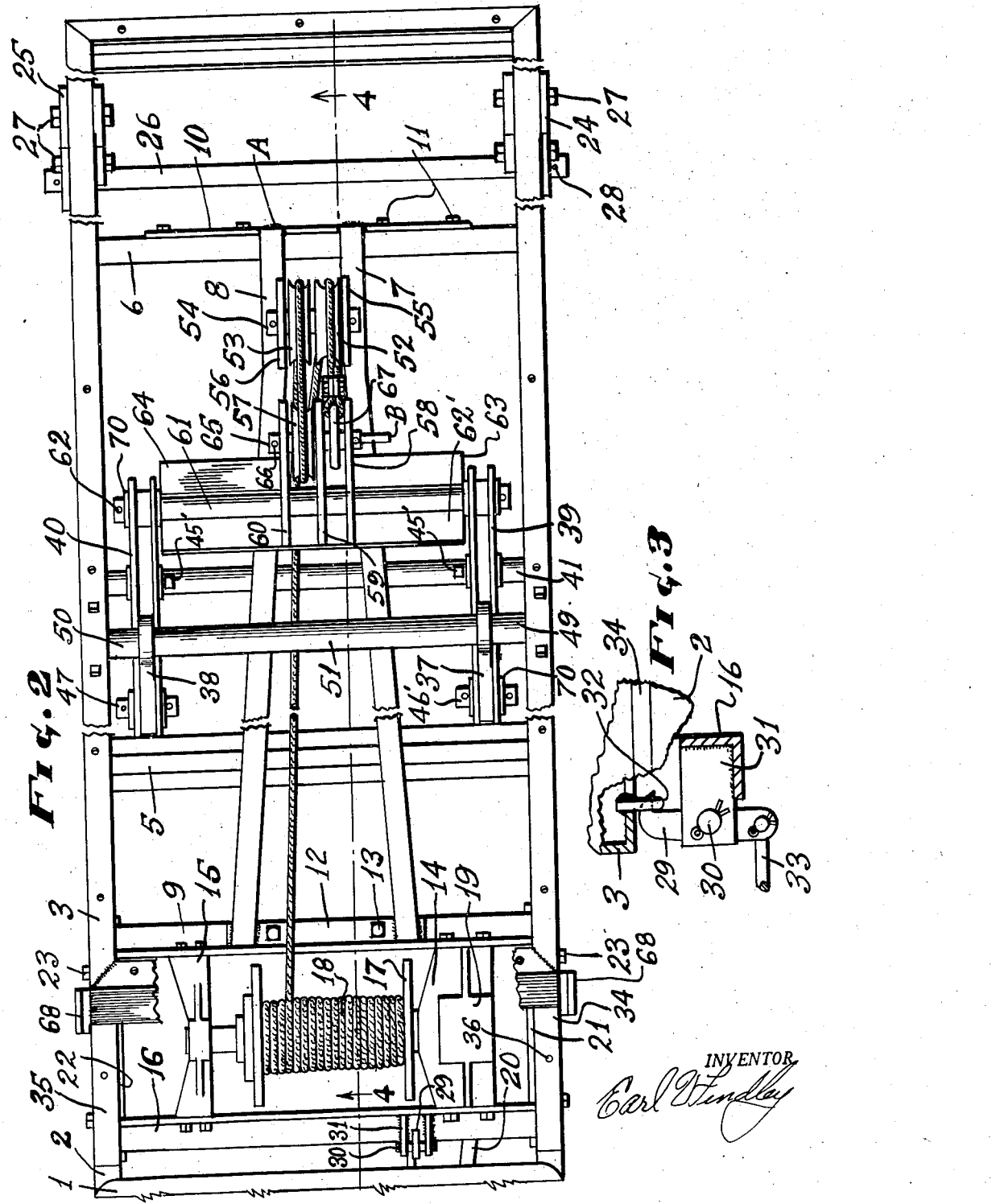

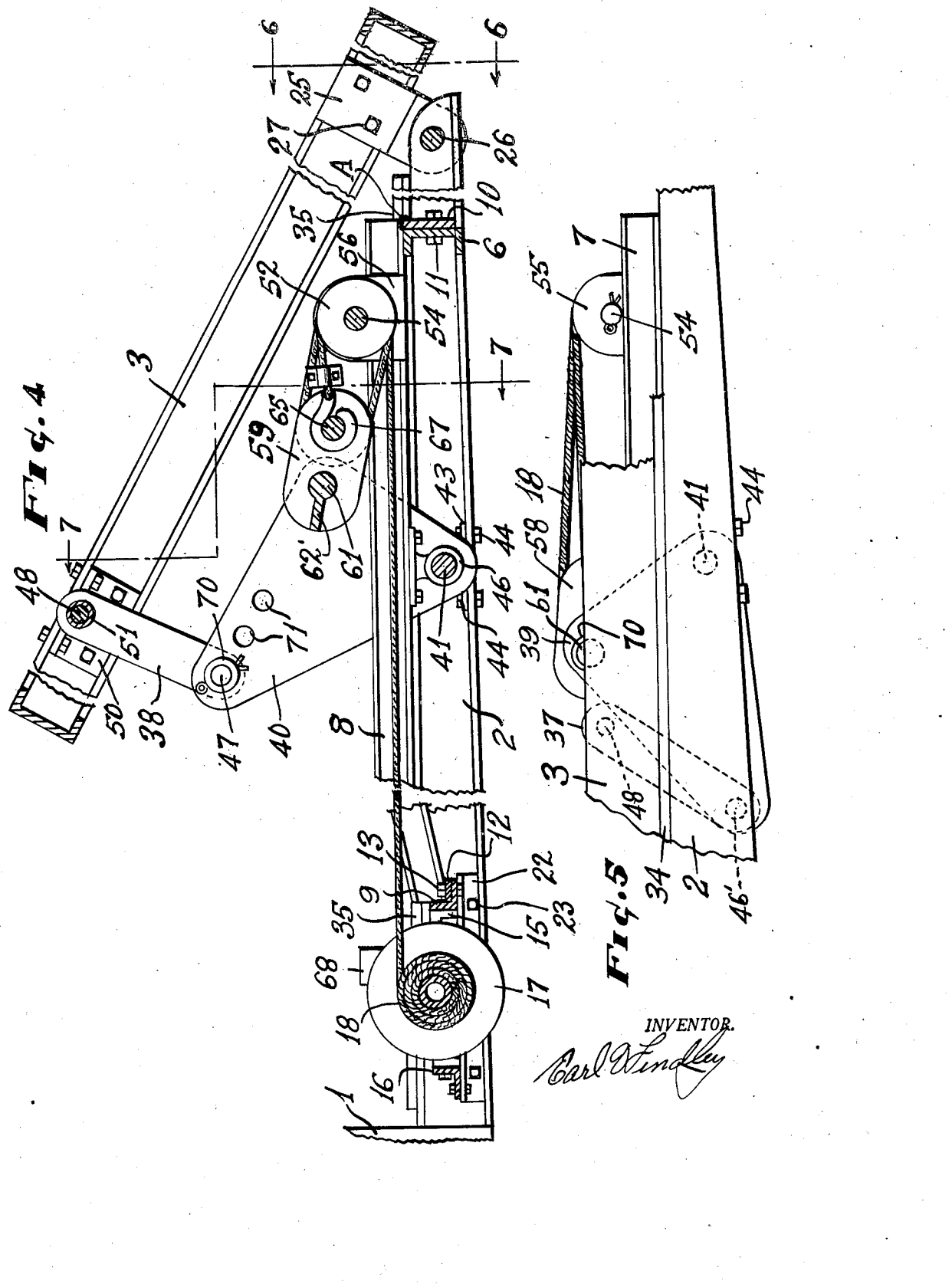

Sept. 20, 1949.  E. V. FINDLEY  2,482,406
CABLE ACTUATED HOISTING MECHANISM
Filed July 26, 1948  4 Sheets-Sheet 4
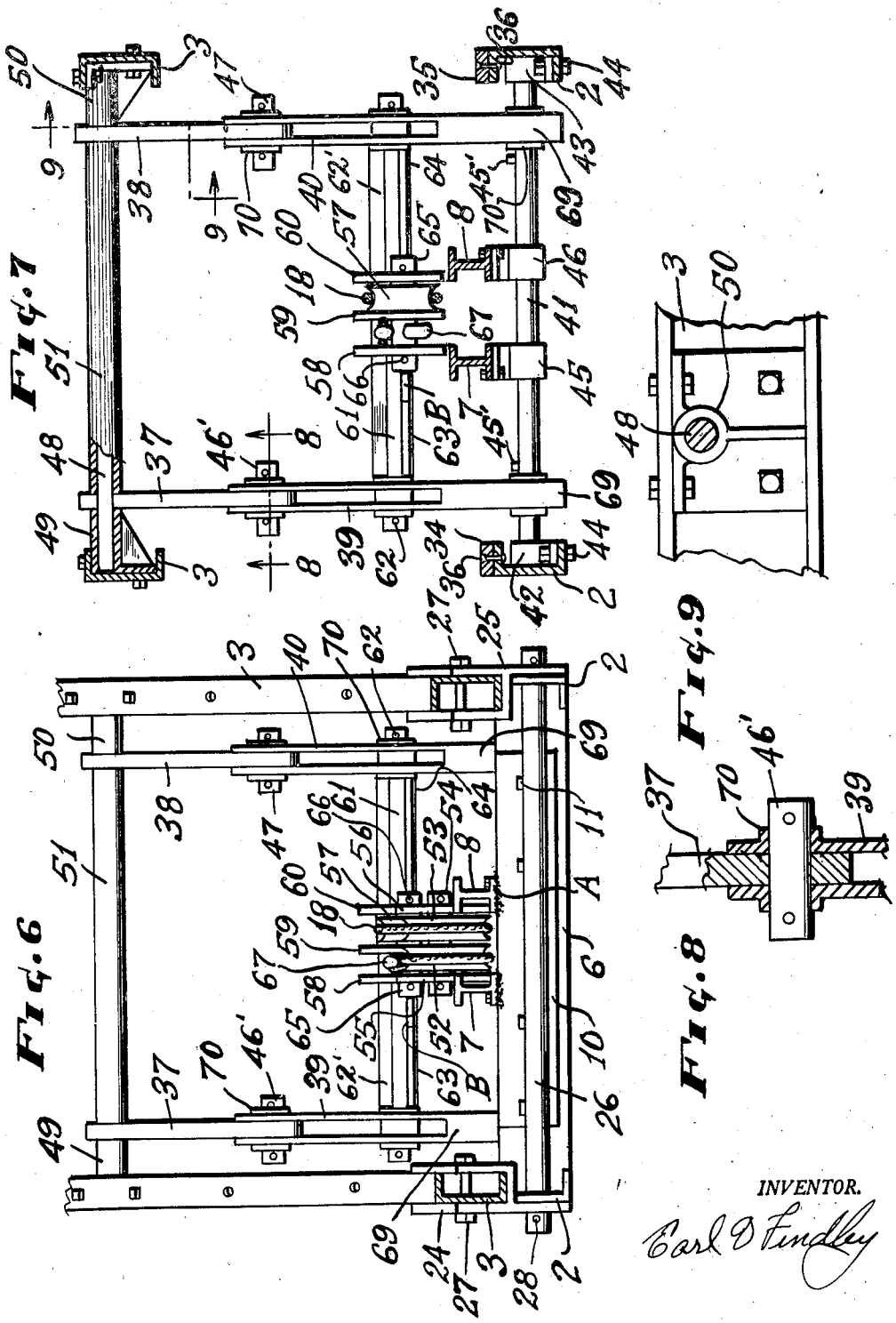
INVENTOR.
Earl V Findley Patented Sept. 20, 1949

2,482,406

UNITED STATES PATENT OFFICE 2,482,406

CABLE ACTUATED HOISTING MECHANISM

Earl V. Findley, Bushton, Kans.

Application July 26, 1948, Serial No. 40,674

2 Claims. (Cl. 298—21)

This invention relates to a cable actuated hoisting mechanism for a dump body, and has for its principal object an extendible jointed structure operated by a power-actuated winch to hoist a truck body to an angular position for dumping purposes, said jointed structure being mounted beneath the truck body and capable of being folded when the body is horizontally positioned, whereby the truck's appearance and operation is undisturbed in its general use.

A further object of this invention is to provide movable and fixed pulleys over which the cable of a winch is trained, whereby sufficient power is available to extend the jointed structure for hoisting of the truck body.

A still further object of this invention is to provide detachable means for the free end of the winch cable so that the cable may be drawn rearwardly from the truck to serve as a pulling power for moving objects by stationarily retaining the truck and operating the winch.

A still further object is to provide tilting means for the bodies of trucks, said means being comparatively simple to construct, efficient in its performance, and the installation of the invention requiring no series alternation of the usual components of the truck.

These and other objects will hereinafter be more fully explained, reference being had to the accompanying drawings forming a part of this specification, and in which like characters will apply to like parts in the different views.

Referring to the drawings:

Fig. 2 is an enlarged plan view of the invention as applied to a truck and dump body frames, the body being removed and parts being broken away for convenience of illustration.

Fig. 3 is an enlarged side view of the means for locking the front end of the dump body downward upon the truck frame.

Fig. 4 is a view taken on line 4—4 in Fig. 2, the body frame being partially tilted and other parts being broken away for convenience of illustration.

Fig. 5 is a fragmentary side elevation of the truck and body frames illustrating the jointed structure folded to horizontally position the body frame.

Fig. 6 is a view taken on line 6—6 in Fig. 4, the forward or upper end of the body frame being broken away.

Fig. 7 is a sectional view taken on line 7—7 in Fig. 4, the body frame being sectionally shown transverse to its length for convenience of illustration.

Fig. 8 is an enlarged sectional view taken on line 8—8 in Fig. 7.

Fig. 9 is an enlarged view taken on line 9—9 in Fig. 7.

Figure 1:
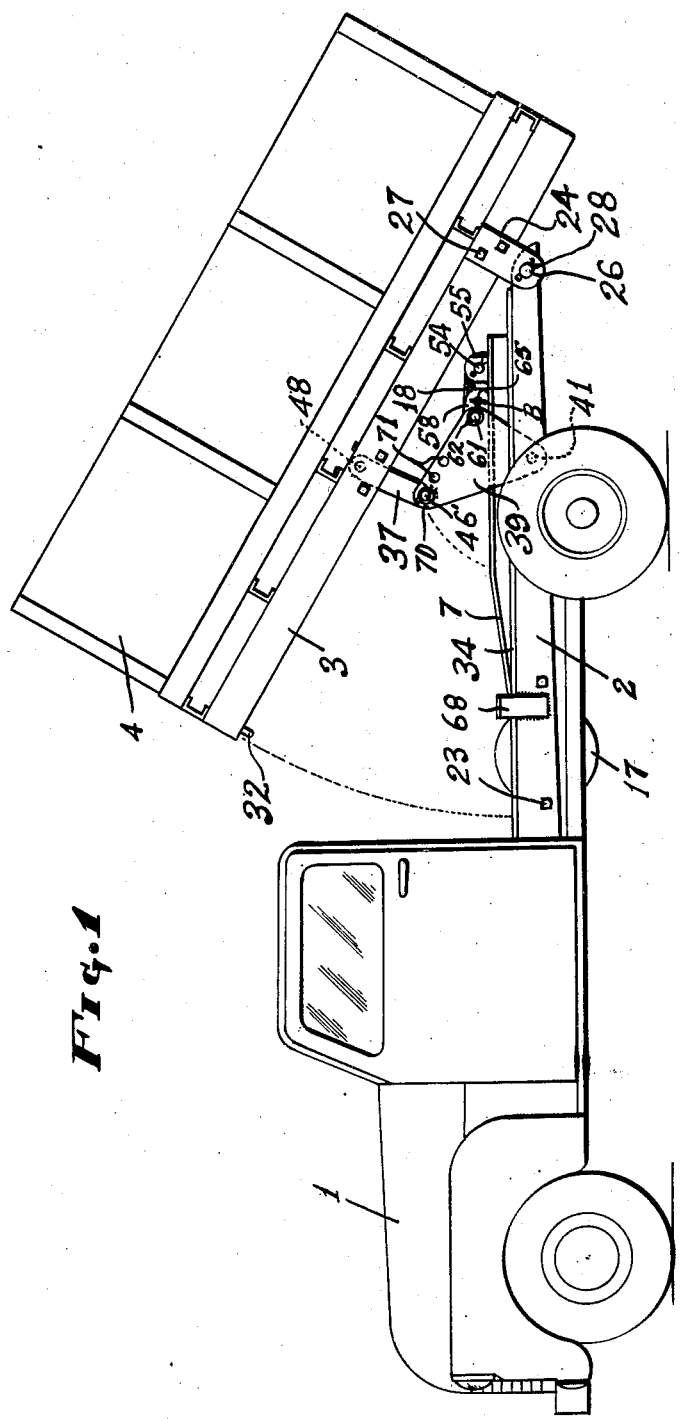
Fig. 1 is a side view of a truck and its body illustrating the application of the invention.

The invention herein disclosed consists of power means to tilt the truck body for dumping purpose, and while I am aware that winches have been in use for a long time, I nevertheless claim the same in combination with the invention herein.

It will be seen in Fig. 1 that the truck 1 has a horizontal chassis frame 2 extending rearwardly of its cab. Upon said frame 2, the usual body frame 3 is mounted for supporting its body 4 that is secured thereon in any suitable manner. As seen in Fig. 2, transverse frame members 5 and 6 are part of the conventional chassis frame 2, but employed in this invention.

Referring specifically to my invention and clearly illustrated in Fig. 2 is a pair of spaced I-beams 7 and 8 running longitudinally of the frame 2. Said beams 7 and 8 are secured upon the transverse frame members 5 and 6, and angle bar 9 that likewise transversely extends across frame 2, the rear ends of said beams being welded to a flat bar 10 as at A, said bar 10 in turn being secured to frame member 6 by bolts 11. The front ends of said beams 7 and 8 are welded to a flat bar 12, which in turn, is secured to angle bar 9 by bolts 13, and it will be seen that the rear ends of said beams 7 and 8 a spaced distance inward are in parallelism and from thence diverging to where they connect to the angle bar 9 for bracing said beams against twisting action when in operation.

The winch structure consists of a pair of bearings 14 and 15 secured to angle bar 9 and a similar angle bar 16 that is positioned forwardly of angle bar 9 a spaced distance to receive said bearings therebetween. Rotatably carried by said bearings is a cable drum 17 upon which is wound a metallic cable 18, the free end of which extends rearwardly for the purpose later described. The winch has its usual gear box 19 and power take-off shaft 20 to control the rotation of said drum, said shaft 20 being operated by the truck's motor but not illustrated in the drawings as it will be understood that the winch structure is not new as it has been previously applied to trucks for a different purpose and function as intended for in this invention. It will be seen that the angle bars 9 and 16 are secured to angle bars 21 and 22, last said bars being secured to frame 2 by bolts 23 as shown in Fig. 4.

The body frame 3 adjacent its rear ends has its side channel members rockably connected to the corresponding rear ends of the side channel members of the chassis frame 2 through the medium of brackets 24 and 25 as shown in Figs. 1, 4, and 6. The lower ends of the brackets are rockably mounted to the rear ends of the frame 2 by a rod 26 that extends across the frame 2, while the upper end of said brackets have a channel in which is seated the body frame 3 and secured rigidly by bolts 27 as shown in Fig. 6. The rod 26 has keys 28 adjacent its outer ends to avoid displacement of said rod. Thus it will be seen that the rockable connection as above described will permit the forward end of the body to raise so that the body may be positioned to an angular position as shown in Fig. 1.

When the body is horizontally positioned, the same is locked at its front end by a rockable pawl 29, that is mounted on a pin 30 carried by ears 31, and said ears 31 being welded to angle bar 16 as shown in Fig. 3. A U-shaped element 32 is welded to the frame 3 of the body to receive the hook of the pawl which retains the body downwardly upon said chassis frame 2. To disengage the hook is by the operation of lever 33, partially illustrated, which lever is conveniently located to an operator of the truck but not being shown in the drawings.

To provide a cushion as well as to avoid rattling of the frames 2 and 3, there is provided elongated strips of wood 34 and 35, respectively. Said strips are secured upon their respective side channels of frame 2 by rivets 36, whereby when the body frame 3 is horizontally positioned, the same will rest upon said strips of wood instead of the chassis frame 2.

The lifting mechanism for the body consists of a pair of arms 37 and 38 for their respective longitudinal side channels of the body frame 3, and triangular plates 39 and 40 rockably fixed to the chassis frame 2 as shown in Fig. 7. It will be seen in Fig. 4 that one pair of corresponding apices of the plates are rockably mounted upon a rod 41 that extends across said frame 2 and is journalled in bearings 42 and 43, said bearings being seated upon the lower legs of the channels of said frame 2 and secured by bolts 44. Intermediate bearings 45 and 46 are likewise provided for rod 41, said bearings being secured to the I-beams 7 and 8. To retain the plates from moving on the rod longitudinally there is provided lugs 45' placed inwardly of said plates and welded to the rod 41 as shown in Fig. 7.

Another corresponding set of apices of the plates are rockably connected to their respective ends of the arms 37 and 38 through the medium of shafts 46' and 47 as shown in Fig. 8. The other ends of the arms 37 and 38 are rockably connected to their respective longitudinal channels of the body frame 3 by a rod 48 that extends thereacross and journalled in suitable bearings 49 and 50 as shown in Fig. 7. To retain the last said ends of the arms in contact with their respective bearings 49 and 50 there is provided a sleeve 51 positioned on the rod to abut the inner sides of the arms.

To extend the arms and the triangular plates and retract the same to a folded position is through the medium of the winch cable engaging on fixed and movable pulley arrangement as follows. A pair of fixed pulleys 52 and 53 are journalled on a shaft 54 that extends through ears 55 and 56, said ears being spaced apart to receive the fixed pulleys therebetween, and said ears being welded to their respective inwardly extending legs of the I-beams. The movable pulley 57 and the free end of the cable is connected to the third or remaining apices of the triangular plates 39 and 40 through the medium of three spaced plates 58, 59, and 60, which are bored in registry adjacent one set of corresponding ends of said three plates to receive a rod 61 therethrough. The ends of said rod 61 engages through the apices above stated and said rod is secured against longitudinal movement therein by pins 62. To secure the three said plates rigidly to said rod 61 is by welding the same thereto and by a continuous web 62' that extends the full length of the rod and extends through corresponding cuts made in the three said plates, and a pair of webs 63 and 64 that extend from plates 58 and 60 to their respective ends of the rod 61 as shown in Fig. 2. It will be seen that movable pulley 57 is journalled on a shaft 65 that engages in the other ends of the plates 58, 59, and 60, said shaft being retained from displacement by keys 66, and said shaft 65 being provided with a lug B welded to one of its ends to serve as a grip when removing said shaft as later described. It will be noted that pulley 57 is in line with fixed pulley 53, while a hook 67, to which the free end of the cable is attached, is in line with the fixed pulley 52, whereby the cable is attached to the movable shaft 65 then trained over fixed pulley 52, then over the movable pulley 57, and from thence over the fixed pulley 53 back to the winch drum. By the aforesaid arrangement sufficient power is provided to unfold the arms and triangular plates when tilting the body with a load of contents therein.

The operation of the invention is as follows. In Fig. 5, the truck body is downwardly positioned, in which case, the arms and plates are folded. Should the body be tilted, the operator of the truck engages the winch which draws the movable pulley 57 and hook 67 toward the fixed pulleys 52 and 53. By such action as above stated, the triangular plates 39 and 40 are rocked on rod 41 causing the said plates and arms to open, which in turn lifts the body through the medium of the extended arms to a tilting position. The body rocks downwardly by its own weight as soon as the cable is released and then is locked upon frame 2.

To cause entire registry of the upper frame 3 with the lower frame 2 when in a downward position there is provided an upwardly extending guide plate 68 for each side thereof as shown in Figs. 1 and 2.

It will be seen that each triangular plate is made from a pair of plates spaced apart sufficient to receive the lower ends of the arms therebetween as shown in Fig. 8. The plate structure otherwise may be secured in spaced relation by a sufficient web 69 welded to the edges of the plates as shown in Fig. 7. The plate structure is provided with hubs 70 to increase bearing surfaces where the rods extend therethrough.

To reduce the upward rock of the truck body from that shown in Fig. 4 may be accomplished by selecting apertures 71 in the plate structure through which the shaft may extend for connection of the arms 37 and 38 thereto, in which case, the power of said lifting mechanism is increased.

It will be seen that the free end of the cable may be easily detached by withdrawing the shaft 65 extending through the hook 67, whereby the cable may be removed from the pulleys and drawn rearward from the truck to be attached to objects desired to be moved. For example, should another vehicle be stuck in mud, the cable may be attached to such vehicle, and then by stationarily retaining the winch equipped truck and operating the winch, the vehicle may be pulled from its stuck condition with good result.

Although in practice I have found the form of my invention illustrated in the accompanying drawings and referred to in the specification as being the most efficient and practical, I do not wish to be so restricted as conditions concurrent with the adoption of the invention will necessarily require slight changes in construction, proportion and arrangement of parts, which may be resorted to within the scope of the appended claims without departing from or sacrificing any of the principles of this invention.

Having fully described my invention what I claim as new and desire to secure by Letters Patent is:

1. In a cable actuated hoisting mechanism for a dump body of a truck, a lower frame, an upper frame seating in registry upon the lower frame, a strip of cushion means secured to the lower frame and being between said frames, bracket means to rockably connect one end of the upper frame with a corresponding end of the lower frame, a triangular plate for each side of the frames, rod and bearing means to rockably carry said plates intermediate the ends of said frame, said rod extending through an apex of said plates and being a fixed rockable point, an arm for each plate, one end of said arm being rockably connected to an other apex of its respective plate, while the other end of said arm is rockably connected to the upper frame intermediate its ends, a pair of spaced beams running longitudinally with the lower frame but being spaced inwardly therefrom, a pair of ears extending upwardly from said beams adjacent the rockably connected end of the upper frame, a pair of pulleys positioned between said ears and a shaft extending through the plates and pulleys to rotatably support said pulleys, a plurality of plates and a shaft to rockably connect the same to the remaining apex of the triangular plates, a pulley and a hook carried by said plurality of plates, and a power actuated winch mounted on the lower frame adjacent the end opposite the rockably connected end, said winch having a cable running therefrom and trained over the pulleys and being connected to the hook to rock the triangular plates theretoward, which in turn, raises the arms thus tilting the upper frame.

2. In a cable actuated hoisting mechanism for a dump body, a chassis frame and a dump body frame rockably mounted on the chassis frame adjacent their rear ends, a plurality of transverse members included in the chassis frame extending across the same from side to side, one transverse member being positioned adjacent the rear ends of the chassis frame and two transverse members being spaced apart and being adjacent the forward end of the chassis frame, a pair of longitudinal beams spaced apart and extending from first said transverse member to the inwardly positioned member of the two said transverse members and being secured thereto, a winch rotatably carried between said two transverse members, a pair of ears welded to the inner sides of the beams adjacent their rear ends, a pair of pulleys and a shaft to journal the pulleys between said ears, a pair of jointed structures placed inwardly from the sides of the frames and intermediate their ends thereof, one member of each jointed structure being a triangular plate, the other member being an arm having one of its ends rockably connected to an apex of the triangular plate, a rod extending through the plates at another apex and means to journal the rod on the chassis frame, a bearing rockably mounting the other ends of the arms to the body frame, a reinforced rod extending from plate to plate and being journalled in the remaining apices of said plates, a group of three plates spaced apart and extending from the reinforced rod intermediately of its ends and toward the pulley ears, a rod extending through the outward ends of the said three plates, a pulley mounted on the rod being between two of said three plates, and a hook placed upon the rod between two of said three plates not occupied by the last said pulley, the cable of the winch extending rearwardly and being trained over the pulley and attached to the hook for rocking the triangular plates and raising the arms, which in turn, tilts the body frame.

EARL V. FINDLEY.

REFERENCES CITED

The following references are of record in the file of this patent:

UNITED STATES PATENTS

| Number | Name | Date |
|---|---|---|
| 1,320,024 | Nearing | Oct. 28, 1919 |
| 1,362,534 | Hinricher | Dec. 14, 1920 |
| 1,378,631 | Stone | May 17, 1921 |
| 1,641,365 | Wood | Sept. 6, 1927 |
| 2,159,470 | Cederstrom | May 23, 1939 |